United States Patent [19]
Gruett

[11] 3,886,796
[45] June 3, 1975

[54] LIQUID LEVEL GAUGE
[75] Inventor: Donald G. Gruett, Manitowoc, Wis.
[73] Assignee: Oil-Rite Corporation, Manitowoc, Wis.
[22] Filed: Nov. 16, 1970
[21] Appl. No.: 89,701

[52] U.S. Cl. .............................................. 73/328
[51] Int. Cl. ........................................ G01f 23/02
[58] Field of Search ............ 73/328, 329, 291, 292, 73/325, 326, 323, 334; 85/70

[56] References Cited
UNITED STATES PATENTS

| | | | |
|---|---|---|---|
| 1,210,385 | 12/1916 | Hunziker | 73/323 |
| 2,828,095 | 3/1958 | Beck et al. | 85/70 X |
| 3,154,945 | 11/1964 | Busillo | 73/328 X |
| 3,358,510 | 12/1967 | Hoffmann et al. | 73/329 |
| 3,455,163 | 7/1969 | Lukas et al. | 73/329 |
| 3,540,276 | 11/1970 | Lyden | 73/328 |

FOREIGN PATENTS OR APPLICATIONS
1,129,252  1/1957  France .................................. 73/328

Primary Examiner—Richard C. Queisser
Assistant Examiner—Daniel M. Yasich
Attorney, Agent, or Firm—Andrus, Sceales, Starke & Sawall

[57] ABSTRACT

The disclosed gauge for indicating the liquid level in a tank comprises a rigid transparent plastic tubular sight member interposed between a pair of hollow end members. Hollow fastening means connect at least one of the end members to the tank for mounting the gauge onto the tank and placing the liquid contents of the tank in communication with the gauge.

4 Claims, 8 Drawing Figures

3,886,796
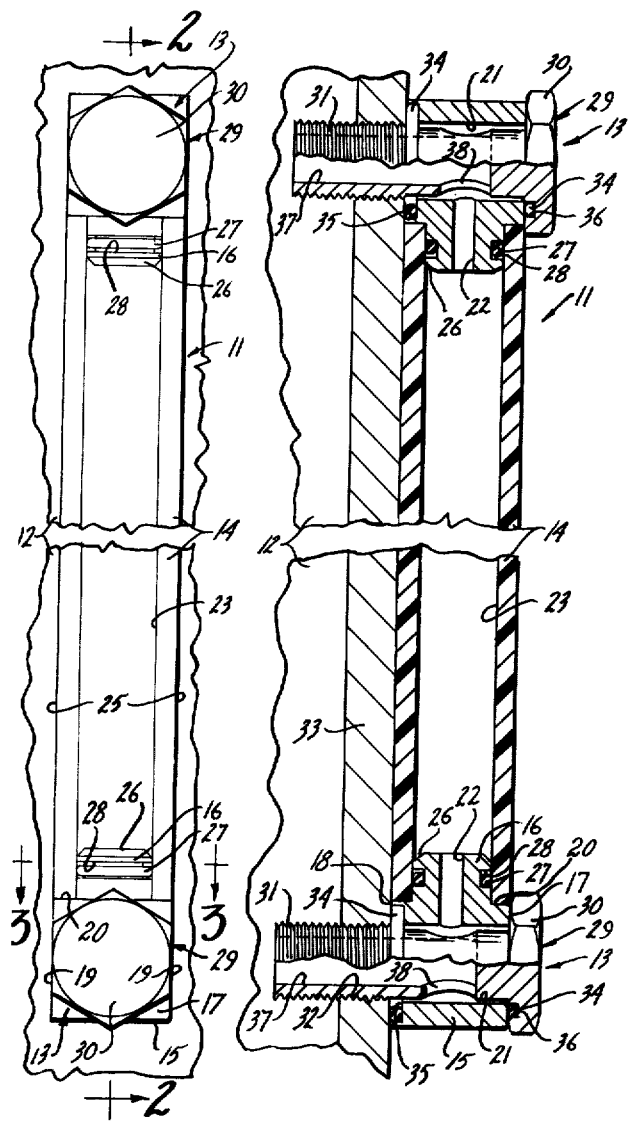
FIG.1  FIG.2
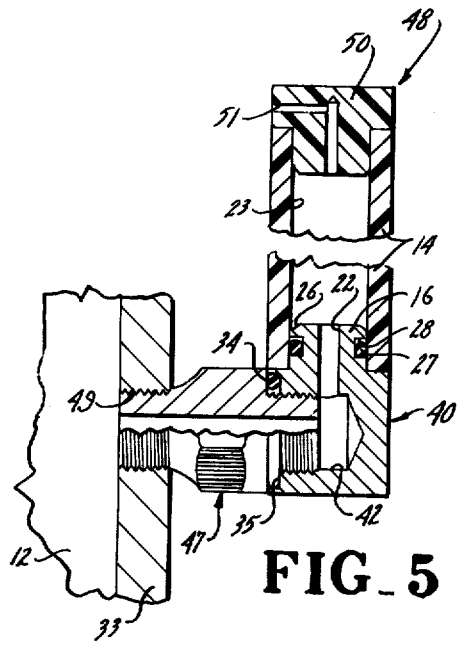
FIG_5
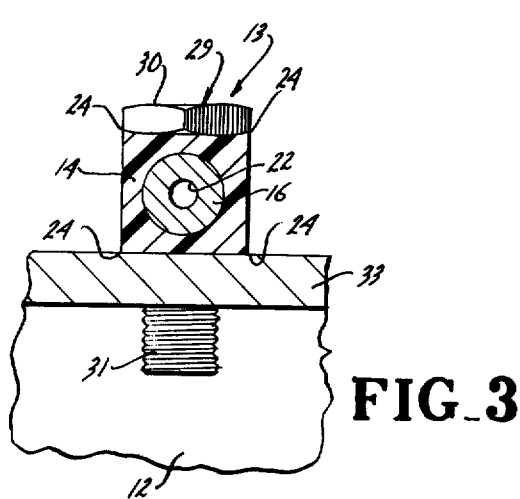
FIG_3
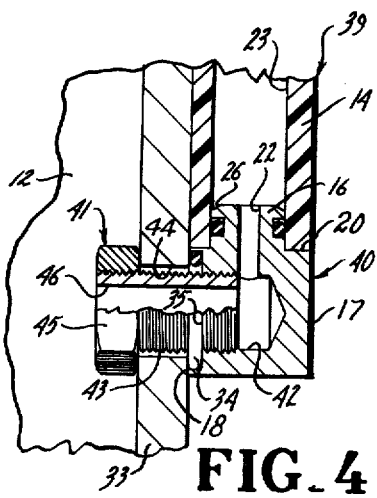
FIG_4
INVENTOR.
DONALD G. GRUETT
BY
Attorneys

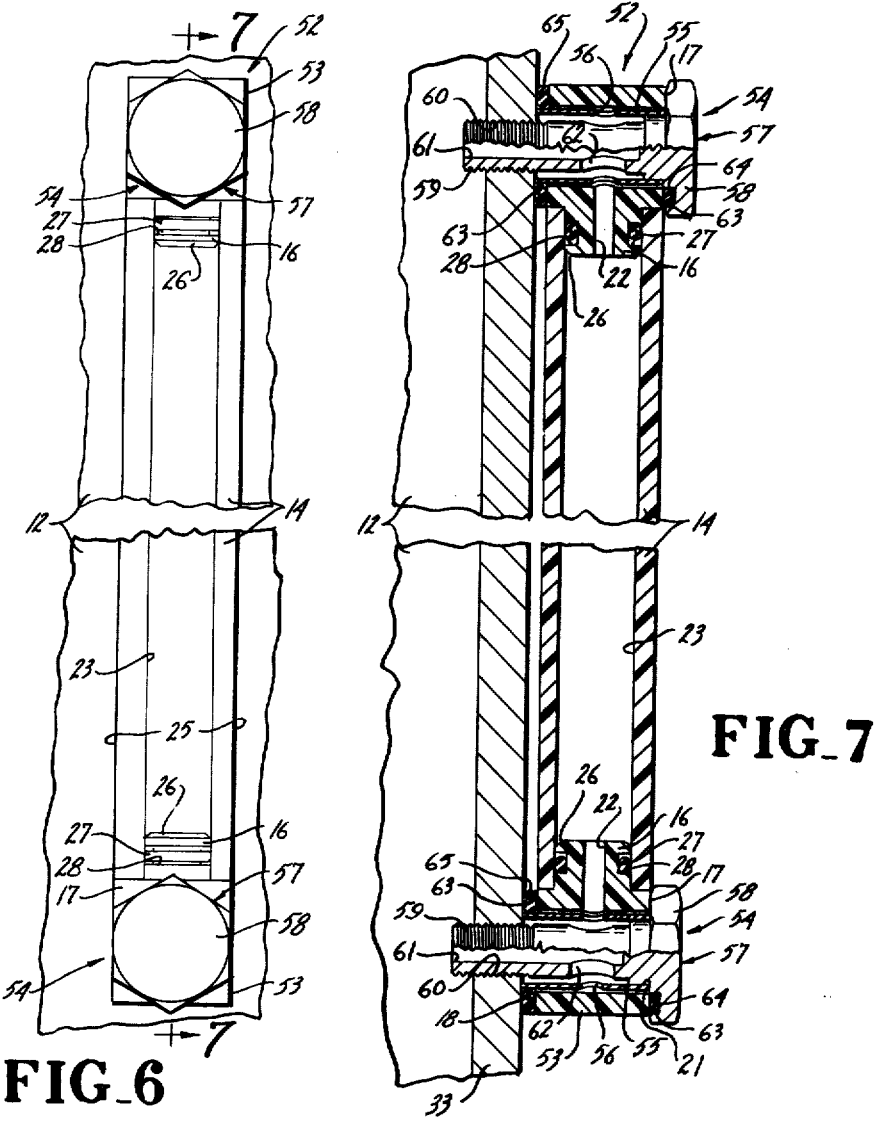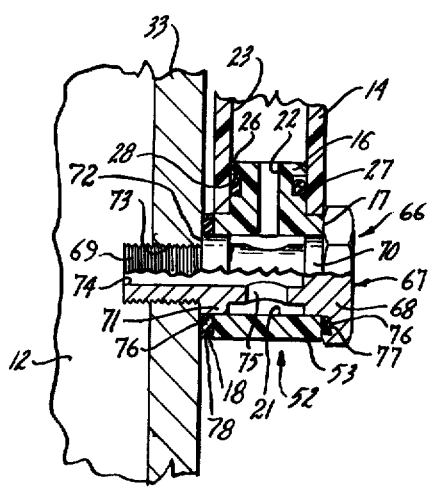

LIQUID LEVEL GAUGE

BACKGROUND OF THE INVENTION

Heretofore, liquid level gauges customarily included a transparent sight removably seated in a suitable shield enclosure or guard which was open in at least one direction to expose the sight to view. U.S. Pat. Nos. 3,358,510 and 3,540,276, owned by the common assignee with this application, disclosed such level gauges. While the patented gauges work very satisfactorily, they are relatively expensive, involve a considerable number of parts, and generally limit sight exposure to a single direction. It is generally an object of this invention to provide a level gauge which is considerably less expensive, requires a minimum of parts and offers a maximum sight exposure.

SUMMARY OF THE INVENTION

Briefly, the liquid level gauge of this invention comprises a rigid transparent plastic tubular member having a cylindrical bore and forming the sight member of the gauge. The tubular sight member is closed at both ends by opposed hollow end members having cylindrical projections receivable in the bore of the tubular member. Hollow fastening means connect at least one of the end members to a tank to place the contents thereof in liquid communication with the gauge.

DESCRIPTION OF THE DRAWING FIGURES

The drawings furnished herewith illustrate the best mode presently contemplated for the invention and described hereinafter.

In the drawings:

FIG. 1 is a front elevation of a liquid level gauge embodying the invention;

FIG. 2 is a sectional view taken generally on line 2—2 of FIG. 1;

FIG. 3 is a sectional view taken generally on line 3—3 of FIG. 1;

FIG. 4 is a partial sectional side elevation of a back mounted liquid level gauge embodying the invention;

FIG. 5 is a sectional side elevation showing a further embodiment of the invention;

FIG. 6 is a front elevation of a liquid level gauge showing a still further embodiment of the invention;

FIG. 7 is a sectional view taken generally on line 7—7 of FIG. 6; and

FIG. 8 is a partial sectional side elevation showing still another embodiment of the invention.

DESCRIPTION OF THE ILLUSTRATED EMBODIMENTS

Referring to the drawings, the liquid level gauge 11 is secured to the partially shown receptacle or tank 12 by means of hollow fastening means 13 to place the gauge in communication with the tank and thereby provide for a visible indication of liquid level in the tank within the range of the gauge.

With particular reference to FIGS. 1-3, the liquid level gauge 11 includes a hollow gauge body or sight member 14 interposed between a pair of vertically spaced hollow metal end members 15. The respective end members 15 are generally identical screw machine parts and are disposed in opposed relation to each other to secure the sight member 14 therebetween.

The respective end members 15 are generally rectangular in horizontal section having a cylindrical projection 16 extending generally centrally from one end thereof. The projection 16 is spaced inwardly from the front 17, rear 18, and opposed sides 19 of the end member 15 to form a radially extending shoulder 20 circumferentially at the base of the projection.

A fore-and-aft extending through bore 21 is provided generally centrally of the respective members 15 for passage of the fastening means 13. The bore 21 is intercepted by the generally vertical bore 22 which extends axially through the projection 16 to place the respective bores in liquid communication.

The gauge body or sight member 14 is a rigid transparent plastic tubular member. Tubular member 14 may be an extrusion of a suitable plastic composition such as a polycarbonate, polysulphon or polyamide. As generally shown in FIG. 3, the member 14 may be generally rectangular in section and has a cylindrical bore 23 generally centrally thereof and extending through its full length. The section of the sight member 14 as shown in FIG. 3 includes greater dimensional thickness at the respective corners 24 of the member to in effect provide vertical columns along the vertical edges 25 of the sight member corresponding to such corners to enhance the strength of the member.

The respective ends of bore 23 of sight member 14 are adapted to receive the cylindrical projection 16 on the corresponding end members 15 with engagement therebetween being by a slip fit or press fit. Upon assembly, the sides of member 14 are generally aligned with the sides of the end member 15 and with relative movement therebetween the end of bore 23 moves past the circumferential chamfer 26 on the end of the projection 16 and past the O-ring seal 27 disposed in the circumferential groove 28 intermediate the length of the projection. In assembled relation the respective ends of the sight member 14 are seated against the shoulder 20 of the corresponding end member 15 with the seal 27 exerting a radial pressure within the bore 23 to seal the sight member against leakage. As generally shown in FIGS. 1-3 the external dimensions of sight member 14 taken cross-sectionally may correspond to those of the end members 15 to provide a generally smooth or planar transition between said members on all sides of the gauge 11.

The fastening means 13 for securing the gauge 11 to the tank or receptacle 12 as shown in FIGS. 1-3 is adapted for front mounting and comprises a bolt 29 having a head 30 and a threaded hollow shank portion 31. The shank portion 31 of the respective bolts 29 extend through the corresponding fore-and-aft bores 21 of the end members 15 and threadedly engage into the vertically spaced tapped holes 32 provided in the wall 33 of the tank 12. O-ring seals 34 are disposed in a counterbore 35 in the rear face 18 of each end member 15 and in the annular groove 36 on the underside of the bolt heads 30 and are compressed against the tank wall 33 and the corresponding end member front face 17 respectively upon tightening of the respective bolts 29 into the holes 32 to seal the respective bores 21 against leakage. The axial bore 37 in the hollow shank portion 31 of bolts 29 is intercepted by the cross through bore 38 which opens into the end member bores 21 in the assembled relation of the bolts to place the liquid contents of tank 12 in communication with the respective bores 21 and hence with the sight member 14. The assembled front mounted gauge 11 of FIGS. 1-3 forms a closed circuit with the tank 12 to give a visible indication of liquid level in the tank within the range of the gauge.

The embodiment of FIG. 4 contemplates a liquid level gauge 39 which is generally similar to the gauge 11 of FIGS. 1–3 except that the end members 40, only one of which is shown, and fastening means 41 are adapted for back mounting of the gauge to the tank 12 as when the interior of the tank is accessible.

In the end members 40 of FIG. 4, the fore-and-aft extending bore 42 opens to the rear face 18 and terminates short of the front face 17. The entrance portion of bore 42 is threaded and engaged by one end portion of a hollow threaded mounting stud 43. In the assemblage of the gauge 39 to the tank 12, the opposite end portion of the mounting stud 43 extends through a corresponding drilled hole 44 in the tank wall 33 and is engaged by a nut 45 on the interior of the tank to secure the gauge to the tank. The axial bore 46 through the stud 43 places the liquid contents in the tank 12 in communication with end member bore 42 and hence with sight member 14 through the vertical bore 22.

According to the embodiment of FIG. 5, a single hollow connecting member 47 supports the liquid level gauge 48 in spaced relation from the tank 12. Connecting member 47 is threaded at both ends to respectively engage within the threaded opening 49 in the tank wall 33 and the threaded entrance to the bore 42 of the end member 40 which is generally similar to the end member of gauge 39 in FIG. 4. In the gauge 48 of FIG. 5, only a single end member 40 is employed at the lower end of the gauge while the upper end of the sight member 14 is closed by an end member in the form of a plug 50. The plug 50 is hollow to the extent of being provided with vent means 51 to prevent entrapment of air which might distort the liquid level indication by the gauge 48.

In the embodiment of FIGS. 6 and 7, the liquid level gauge 52 is provided with end members 53 made of rigid plastic material which may be the same material utilized for the sight member 14. End members 53 are in many respects similar to the metal end members 15 of the FIGS. 1–3 embodiment and have a cylindrical projection 16 which is received by a slip or press fit in the end of bore 23 of the sight member 14, the fore-and-aft extending through bore 21, and the vertical bore 22 which intercepts the through bore 21. If, however, the bolt 29 of the FIGS. 1–3 embodiment were employed with the plastic end members 53, crazing or stress cracking is likely to result in the end member when the bolt is pulled up tight to render such end member unfit for use. As a consequence, fastening means 54 are provided for use with the plastic end members 53 for securing the gauge 52 to the tank 12.

The fastening means 54 employed in FIGS. 6 and 7 includes a metal spacing sleeve 55 which is disposed in the through bore 21 and exceeds in length the distance between the front and rear faces 17 and 18 of the end member 53. Sleeve 55 is provided with a plurality of radial openings 56 so that the interior of the sleeve is in liquid communication with the bore 21 and hence with the sight member 14 through the vertical bore 22. The bolt 57 having a head 58 and hollow threaded shank 59 extends through the sleeve 55 and is engaged within a correspondingly threaded opening 60 in the tank wall 33. The axial bore 61 in the bolt shank 59 is intercepted by the cross bore 62 in the shank to place the tank 12 in liquid communication with the interior of the sleeve 55 and hence with the sight member 14. Forwardly the end member through bore 21 is sealed by O-ring 63 disposed in an annular groove 64 in the underside of the bolt head 58 and engageable with the front face 17 of the end member 53. A second O-ring 63 confined by a washer 65 is disposed between the rear face 18 of the end member 53 and the tank wall 33 to seal the bore 21 rearwardly. When the bolt head 58 is drawn up tight to bottom the metal sleeve 55 against the tank wall 33, the plastic end member 53 is subjected only to the pressure imposed thereon by the opposed O-rings 63.

FIG. 8 shows another form of fastening means 66 which may be employed with the gauge 52 having plastic end members 53. The fastening means 66 comprises a bolt 67 having a head 68 and a hollow shank 69. The shank 69 of bolt 67 includes a spool-like portion providing the shank with a pair of axially spaced annular projections 70 and 71 which closely approximate the diameter of the through bore 21. The annular projection 70 is immediately beneath the bolt head 68 and upon assembly enters the forward end of bore 21. The rearwardly disposed annular projection 71 forms a rearwardly facing annular shoulder 72 which is spaced from the bolt head 68 by a length which exceeds the distance between the front and rear faces 17 and 18 of the end member 53. Rearwardly from shoulder 72 the shank 69 of bolt 67 is threaded and engageable within the threaded opening 73 in the tank wall 33. The axial bore 74 in the bolt shank 69 is intercepted by the cross bore 75 provided in the shank between the annular projections 70 and 71 placing the tank 12 in liquid communication with the through bore 21 and hence with the sight member 14. The through bore 21 is sealed forwardly by the O-ring 76 which is disposed in the annular groove 77 in the underside of bolt head 68 and is engageable with the front face 17 of end member 53. Another O-ring 76 confined radially by a washer 78 is disposed between the rear face 18 of end member 53 and the tank wall 33 to seal the rear end of through bore 21. When the bolt 67 of FIG. 8 is drawn up tight to bottom the shoulder 72 against the tank wall 33, the plastic end member 53 is again only subjected to the pressure imposed thereon by the opposed O-rings.

The liquid level gauge of this invention offers considerable advantage over the gauge structures wherein the transparent sight member is disposed in a suitable metal shield enclosure or guard. With no enclosure to impede sight, this invention provides a gauge offering maximum sight exposure. The relatively few parts involved in the gauge of this invention, contribute to a lower cost and greater ease of assembly. As compared to the gauge structures wherein the sight member is enclosed in a metal shield enclosure, a gauge of this invention of comparable length can be produced at a substantial saving in cost.

Various modes of carrying out the invention are contemplated as being within the scope of the following claims particularly pointing out and distinctly claiming the subject matter which is regarded as the invention.

I claim:

1. In a gauge for indicating the liquid level in a tank, a pair of vertically spaced hollow end members, the respective end members having a cylindrical projection extending therefrom in facing and axially aligned relation, said projections having an axial through bore communicating with the hollow interior of the corresponding end member and a circumferential groove exteriorly thereof, a rigid transparent plastic tubular sight member interposed between said end members and having a cylindrical bore adapted to receive the end member projections in opposed relation and said sight member comprising the sole connection between the opposed end members, said plastic tubular sight member being generally rectangular in section to provide greater material thickness at the respective corners to in effect provide for vertical columns along the respective edges corresponding to such corners to enhance the strength of the sight member, an O-ring seal disposed in the grooves of the respective end member projections and sealingly engaging with the tubular member to seal the connections between the tubular member and the respective end members, and hollow fastening means connecting at least one of said end members to the tank for mounting the gauge and placing the liquid contents of the tank in communication with the sight member.

2. In a gauge for indicating the liquid level in a tank, a pair of vertically spaced hollow end members, the respective end members having a cylindrical projection extending therefrom in facing and axially aligned relation, said projections having an axial through bore communicating with the hollow interior of the corresponding end member and a circumferential groove exteriorly thereof, a rigid transparent plastic tubular sight member interposed between said end members and having a cylindrical bore adapted to receive the end member projections in opposed relation and said sight member comprising the sole connection between the opposed end members, an O-ring seal disposed in the grooves of the respective end member projections and sealingly engaging with the tubular member to seal the connections between the tubular member and the respective end members, hollow fastening means connecting at least one of said end members to the tank for mounting the gauge and placing the liquid contents of the tank in communication with the sight member, the respective end members being made of a rigid plastic material and the hollow fastening means comprising a headed bolt and spacer means associated with the bolt, said bolt extending in a fore-and-aft direction through the hollow end member, and sealing means around the bolt at the front and rear of the end member to seal the member against the bolt head and tank respectively, said spacer means providing for bottoming of the bolt relative to the tank with the plastic end member being subjected only to the pressure imposed thereon by the opposed sealing means.

3. The invention as set forth in claim 2 wherein the spacer means is a sleeve member having radial openings and which extends through the hollow end member between the bolt head and the tank.

4. The invention as set forth in claim 2 wherein the spacer means is provided by a shoulder on the bolt which is engageable with the tank to bottom the bolt.

* * * * *